United States Patent
Drewes et al.

(10) Patent No.: US 10,358,007 B2
(45) Date of Patent: Jul. 23, 2019

(54) LINK UNIT AND METHOD FOR PRODUCING A LINK UNIT

(71) Applicant: SAF-HOLLAND GmbH, Bessenbach (DE)

(72) Inventors: Olaf Drewes, Aschaffenburg (DE); Frederik Biewer, Haibach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 245 days.

(21) Appl. No.: 15/306,690

(22) PCT Filed: Mar. 31, 2015

(86) PCT No.: PCT/EP2015/056945
§ 371 (c)(1),
(2) Date: Oct. 25, 2016

(87) PCT Pub. No.: WO2015/172936
PCT Pub. Date: Nov. 19, 2015

(65) Prior Publication Data
US 2017/0057314 A1 Mar. 2, 2017

(30) Foreign Application Priority Data
May 14, 2014 (DE) .................. 10 2014 209 080

(51) Int. Cl.
*B60G 7/00* (2006.01)
*B60G 9/00* (2006.01)
(Continued)

(52) U.S. Cl.
CPC ............. *B60G 7/001* (2013.01); *B21D 53/88* (2013.01); *B23K 20/129* (2013.01); *B60G 9/003* (2013.01);
(Continued)

(58) Field of Classification Search
CPC .... B60G 7/001; B60G 9/003; B60G 2206/32; B60G 2206/81; B60G 2206/82013
See application file for complete search history.

(56) References Cited

U.S. PATENT DOCUMENTS

| 4,230,252 A * | 10/1980 | Meyer .................. B21D 53/88 228/152 |
| 7,090,309 B2 * | 8/2006 | Blessing ................. B60B 35/04 301/124.1 |

(Continued)

FOREIGN PATENT DOCUMENTS

| DE | 10 2009 049 966 | 4/2011 |
| EP | 0920948 | 6/1999 |

(Continued)

OTHER PUBLICATIONS

European Patent Office, International Search Report, dated Jun. 22, 2015.

*Primary Examiner* — Faye M Fleming
(74) *Attorney, Agent, or Firm* — Price Heneveld LLP

(57) ABSTRACT

The present invention relates to a method for producing a link unit, comprising the steps of provision of a carrier, reshaping of the carrier in the region of a first connecting section in such a way that an upset section is formed, the wall thickness of the carrier being increased in the region of the upset section, and provision of a node element with a joint section, and connecting of the joint section to the first connecting section by means of a rotary friction welding method. Furthermore, the invention relates to a link unit, in which a carrier which is configured in the manner of a hollow body is connected to a node element by means of a rotary friction welding method.

19 Claims, 4 Drawing Sheets

(51) Int. Cl.
*B23K 20/12* (2006.01)
*B21D 53/88* (2006.01)
*B23K 101/00* (2006.01)

(52) U.S. Cl.
CPC .... *B23K 2101/006* (2018.08); *B60G 2200/31* (2013.01); *B60G 2204/4302* (2013.01); *B60G 2206/11* (2013.01); *B60G 2206/32* (2013.01); *B60G 2206/81* (2013.01); *B60G 2206/82013* (2013.01)

(56) References Cited

U.S. PATENT DOCUMENTS

| | | | | |
|---|---|---|---|---|
| 8,353,562 | B2 * | 1/2013 | Spielmann | B21K 1/06 |
| | | | | 301/124.1 |
| 8,388,000 | B2 * | 3/2013 | Hessing | B21D 53/88 |
| | | | | 280/124.134 |
| 9,650,083 | B2 * | 5/2017 | Graefe | B29C 43/16 |
| 9,764,764 | B2 * | 9/2017 | Irle | B62D 21/11 |
| 2006/0131949 | A1 * | 6/2006 | Jahani | B21C 25/08 |
| | | | | 301/124.1 |
| 2006/0201227 | A1 * | 9/2006 | Lepre | B21C 1/24 |
| | | | | 72/370.14 |
| 2007/0040345 | A1 * | 2/2007 | Hardtke | B60G 9/02 |
| | | | | 280/124.164 |
| 2009/0305077 | A1 | 12/2009 | Mizuguchi et al. | |

FOREIGN PATENT DOCUMENTS

| | | |
|---|---|---|
| EP | 2639089 | 9/2013 |
| JP | H03193512 | 8/1991 |
| JP | H08300167 | 11/1996 |
| JP | 2000288747 | 10/2000 |
| JP | 2001132728 | 5/2001 |
| JP | 2002336795 | 11/2002 |
| JP | 2010188924 | 9/2010 |
| JP | 2012110920 | 6/2012 |
| WO | 9701412 | 1/1997 |
| WO | 2014040884 | 3/2014 |
| WO | 2014040887 | 3/2014 |

\* cited by examiner

LINK UNIT AND METHOD FOR PRODUCING A LINK UNIT

BACKGROUND OF THE INVENTION

The present invention relates to a method for producing a link unit, and to a link unit, in particular for use in commercial vehicles.

Link units of this type and methods for producing them are already known from the prior art. Thus, in particular in commercial vehicle chassis, the axles or axle stub arrangements are mounted by means of longitudinal links which are suspended pivotably on the frame of the vehicle, spring elements and torsional damper elements at the same time acting on the longitudinal links and ensuring controlled displaceability of the wheels of the commercial vehicle which are arranged on the chassis. Here, the longitudinal links which are known from the prior art are frequently configured as cast parts, more or fewer additional components of the link or components to be connected to the link being configured in one piece with the longitudinal link. In the case of said links which are configured as a cast part, the high weight, the great production complexity, in particular in the case of relatively complex link geometries, and the lack of welding capability have proven disadvantageous. Furthermore, longitudinal links are known which are constructed from individual metal sheets in a box design and are welded together. However, said links require extremely high mounting complexity, and their strength is sometimes weakened on account of the numerous welded seams. The known link units therefore have significant disadvantages, in particular with regard to the weight and with regard to the manufacturing complexity.

It is an object of the present invention to provide a method for producing a link unit, which method can be realized as simply as possible and at the same time makes a weight reduction possible of the link unit which is produced by way of said method. Moreover, it is an object of the present invention to provide a link unit which can be produced particularly simply and, moreover, has sufficient strength and service life with simultaneously low weight.

SUMMARY OF THE INVENTION

According to the invention, the method for producing a link unit comprises the steps of provision of a carrier which has a first connecting section, reshaping of the carrier in the region of the first connecting section in such a way that an upset section is formed, the wall thickness of the carrier being increased in the region of the upset section, provision of a node element with a joint section, and connecting of the joint section to the first connecting section by means of a rotary friction welding method. In terms of its provision, the carrier is a component which is of as simple design as possible, and is preferably configured in the manner of a hollow body. The carrier is preferably a tube of cylindrical configuration. At one end or one of its end sides, the carrier has a first connecting section which is suitable, in particular, for fixing the node element to the carrier. In order for it to be possible to fix the carrier and the node element to one another by means of a rotary friction welding method, it is provided that a reshaping operation is carried out as an intermediate step, in which the carrier is upset in the region of the first connecting section. The reshaping is expediently carried out before the connection of the joint section to the first connecting section. During said reshaping or upsetting, the wall thickness of the carrier is increased in such a way that an upset section is produced on the carrier. The increase in the wall thickness of the carrier in the region of the connecting section and/or in the region of the upset section facilitates and improves the connection between the carrier and the node element with the use of a rotary friction welding method. It is advantageous, in particular, for the rotary friction welding method that a certain minimum contact area is provided between the components which are to be welded to one another. In this way, relatively large-area melting during the welding on the two components ensures a connecting zone between the two components carrier and node element, which connecting zone is as uniform as possible and is configured with only a few imperfections in the structure. In particular, it is preferred that the joint section of the node element has a similar wall thickness to the upset section with the connecting section which is arranged in the direction of the node element. In this way, sudden changes in the section modulus with respect to torsion and bending in the joint section between the carrier and the node element can be reduced or preferably completely prevented in the joined state of the link unit. Jumps of this type of the section modulus, for example, with respect to bending occur if components with different wall thicknesses are welded directly to one another and therefore a notch effect occurs in the joint section. In particular in the case of link units which are loaded cyclically, it is necessary to reduce said notch effect to a minimum, in order for it to be possible to achieve a service life of the link unit which is as long as possible. It is advantageous in the case of the proposed method that, apart from the upset section, the carrier retains its original wall thickness and is therefore of lightweight configuration. The solidification of the structure in the region in and adjacent with respect to the upset region which is achieved during upsetting ensures a sufficient overall strength of the carrier and of a link unit which is equipped with said carrier.

The carrier preferably has a substantially hollow-cylindrical shape in its first state, and is changed by means of reshaping into a second state, in which the carrier is of curved configuration. The curvature which expediently runs transversely with respect to the cylinder axis serves, in particular, for optimized utilization of the installation space which is available in the region of the link unit. Thus, the usability of the link unit can be improved for selected vehicle models, by a curvature of the carrier being provided, which curvature provides space for peripheral systems, such as brake cylinders or axle lift systems. A carrier which is configured as a simple tube in its first state can be produced and processed further cheaply and simply, in particular. In order to change the carrier from its first, substantially hollow-cylindrical shape which runs straight along a cylinder axis into its second state, in which it has a curvature transversely with respect to the cylinder axis of the first state, a simple cold forming method is preferably used. As an alternative, a hydroforming method can also be used. The advantage of a simple tube bending method, in which a mandrel is optionally introduced into the carrier and simple jaw elements are attached from the outside to the carrier, is that the technology which is necessary for carrying out the reshaping method is substantially less complex and susceptible to faults than, for example, in the case of a hydroforming method. In contrast, more complex geometries can be realized by way of a hydroforming method. In addition, only minor damage of the surfaces of the carrier is to be expected in the case of hydroforming.

The carrier is particularly preferably changed into the second state after welding to the node element. In other words, the method step of reshaping the carrier from the rectilinearly cylindrical shape into a curved shape in the manner of a hollow body is carried out only after the method step of rotary friction welding of the node element to the first connecting section of the carrier. The advantage here is that the carrier can be fixed on the node element more easily, by means, for example, of a rotational friction welding method, in its simply cylindrical design. Thus, in particular, the rotation of the hollow-cylindrical, straight carrier is associated with less complexity than in the case of a carrier of non-cylindrical configuration, in which unbalances occur relative to the rotational axis. It is therefore preferably possible, furthermore, that the carrier has a uniform weight distribution relative to a rotational axis, about which it is rotated during the rotary friction welding, the contact area between the node element and the carrier at the same time being oriented perpendicularly with respect to the rotational axis.

As an alternative, the carrier is preferably changed into the second state before welding to the node element. This can be preferred, in particular, when it is desired to keep the bending technology which is used for bending of the carrier particularly simple, the carrier which is configured as a simple tube in the first state being deformed into a curved tube in a simple way. The rotary friction welding can also be, in particular, vibration friction welding or linear friction welding, in which either the carrier and the node element are set in vibration with respect to one another longitudinally or parallel to a plane which runs through the joining face and are pressed against one another, local melting occurring in the region of the welding zone as a result of the friction of the carrier and the node element on one another. Unbalances on the components to be welded are without significance for said vibration friction welding method. Therefore, the simpler bending operation of the carrier from the first into the second state can advantageously already be carried out before welding to the node element.

In particular, the carrier is preferably changed into the second state by means of cold forming. The cold forming method is distinguished by its particular simplicity, since no heating and subsequent cooling of the carrier is necessary, and the carrier can therefore also be inserted simply into the reshaping tool and removed therefrom again by an engineer or a worker without further protection or special handling means. Both costs and time can be saved in this way.

Furthermore, the carrier is preferably a cylindrical tube with a constant wall thickness during its provision. In order, in particular, to reduce the material costs and/or the semi-finished product costs during the production of a link unit, it is favorable for it to be possible to use components of particularly simple design, such as a cylindrical tube. It is preferred here, furthermore, that the carrier has a constant wall thickness in its first state and before reshaping by means of upsetting. In this context, the wall thickness is measured, in particular, perpendicularly with respect to the cylinder axis of the carrier. In the context of the present invention, it is provided by way of a substantially constant wall thickness that relatively small unevennesses which are a result of the manufacturing or lie within the limit of the applicable tolerances of components of this type are defined as being constant within the context of the present invention.

The carrier particularly preferably has a second connecting section at its end which lies opposite the first connecting section, on which second connecting section a bearing socket can be fixed or is fixed. The bearing socket is preferably a bearing bush which is provided for pivotable mounting of the carrier on the frame of a chassis. The second connecting section preferably has corresponding contact faces which advantageously can be fixed or are preferably fixed on the outer wall of the bearing socket by means of a thermal welding method. According to expectations, the torque and torsional forces which act on the second connecting section are substantially lower than the forces which act on the first connecting section between the node element and the carrier. It is therefore preferred to configure the carrier to be as thin-walled as possible in the region of the second connecting section, in order for it to be possible to save, in particular, preferably material costs and weight.

Furthermore, a holding element can preferably be fixed or is fixed on the carrier, in particular by means of frictional welding. The holding element is preferably a suspension point for a shock absorber. In particular, the holding element is preferably fixed on the outer face of the carrier, preferably in the region of the upset section, by means of a rotary friction welding operation.

The outer contour of the carrier is advantageously kept substantially constant during the configuration of the upset section. In other words, the outer face of the carrier is not influenced during reshaping or preferably upsetting of the carrier, and the thickened material portion is produced merely on the inner wall. As a result, the risk of surface cracks in the region of the upset section which are produced, in particular, in the case of cyclical loading is minimized.

According to the invention, furthermore, a link unit is preferably provided which has a carrier and a node element, the carrier being configured in the manner of a hollow body and having a tubular section and, adjacently with respect to the tubular section, an upset section, the upset section having a greater wall thickness than the tubular section, it being possible for the node element to be fixed, or the node element being fixed, on the carrier by means of a rotary friction welding method on that side of the upset section which faces away from the tubular section. The link unit is advantageously provided in a second state, in which the carrier has a curved arcuate longitudinal extent and is otherwise configured as a tube in the manner of a hollow body. In addition to the creation of installation space, the curved configuration of the carrier and, in particular, of the tubular section also allows a favorable transmission of force between the node element which is fixed on the carrier, an axle tube which is fixed on the link unit, and a bearing socket which is fixed at the opposite end of the carrier. It is of great advantage here, furthermore, that the node element is fixed via a rotary friction welding method on the carrier, in particular on a first connecting section of the carrier. The friction welding is distinguished by the fact that only minor structure damage and local thermal stresses occur on account of the welding temperatures which are relatively low in comparison with thermal methods, and the material in the region of the joint zone is therefore suitable for withstanding higher tensile and shear forces than would be the case after the use of a thermal welding method. Otherwise, it is possible by way of the frictional welding to weld material combinations (for example, aluminum and steel) to one another which cannot be welded to one another by way of thermal welding methods. In order to improve the attachment of the node element on the carrier, the carrier has an upset section which has a greater wall thickness than the tubular section of the carrier. Here, the upset section is arranged, in particular, at that end of the carrier, at which the node element can be fixed and is preferably fixed on the carrier by means of frictional welding. The greater wall thickness of the upset section allows a wider melting zone to be produced between the carrier and the node element, and therefore the corresponding bending moments can be transmitted from the node element to the carrier over a larger, more uniform area. Here, the upset section of the carrier is advantageously formed by means of a reshaping method, it being possible for particularly high strength values and, as a result of the nature of the structure configured during reshaping of the transition zone between the tubular section and the upset section, particularly high bending moments and forces to be transmitted in this way. Reshaping is also preferred because local increases in the structure strength are formed during reshaping, which local increases, in particular, provide the reshaped zone of the upset section with a higher tensile strength.

The upset section preferably has a mean wall thickness which is in a ratio of from 1.1 to 5, preferably from 1.2 to 4 and particularly preferably of from 1.2 to 3.5 to the mean wall thickness of the tubular section. Here, the ratio range of from 1.1 to 5 which has been found within the context of the invention has been shown to be advantageous, in particular, for a broad spectrum of production materials to be used for the link unit. Thus, a factor of 5 can be preferred here, in particular, when a particularly thin-walled tubular section is sufficient to transmit the corresponding bending moments and forces, and at the same time, however, the upset section has to have a particularly great wall thickness, in order to provide a welding zone which is as large as possible for use of the rotary friction welding method, since, in particular, the bending moments which occur in the region of the upset section are expected to be very high. In the case of a ratio of 1.1, material with particularly satisfactory welding capability and with a tendency to form particularly solid structure connections between the welded materials can preferably be used, the carrier at the same time having a relatively great wall thickness in the region of the tubular section, in particular in order for it also to be possible to transmit corresponding longitudinal forces independently of the bending moments to the link unit. Here, the preferred range of from 1.2 to 4 has been shown to be advantageous for use in highly loaded commercial vehicles, the upper limit of 4 being advantageous, in particular, for relatively long carriers, and the lower ratio range of 1.2 also being suitable for the customarily used weldable cast materials, from which longitudinal links of commercial vehicles are produced. Here, the ratio range of from 1.2 to 3.5 which is particularly preferred has been shown to be particularly advantageous for link units which are produced at least partially from spheroidal graphite iron. As long as the ratio of the wall thickness of the upset section to the wall thickness of the tubular section is kept within a ratio of from 1.2 to 3.5, a particularly weight-optimized design of the link unit, in particular of the carrier of the link unit, can be achieved.

A transition section is advantageously arranged between the tubular section and the upset section, the transition section having a wall thickness which increases monotonically toward the upset section. The transition section serves, in particular, to prevent the notch effect in the region of the joint zone between the carrier and the node element. Here, in other words, the transition section prevents a sudden decrease or a sudden drop of the wall thickness from the tubular section toward the upset section or from the upset section toward the tubular section. The transition section is particularly preferably configured during the reshaping or preferably during the upsetting of the carrier, a fiber-like structure profile being configured between the tubular section and the upset section in the transition section, in particular. It is particularly preferred here that the wall thickness of the transition section increases monotonically, in particular the transition section does not have a consistent wall thickness, but rather merely a mean thickness can be determined as a wall thickness which, in the preferred case, is the mean value of the wall thickness of the upset section and the wall thickness of the tubular section. Here, the monotonic rise of the wall thickness of the transition section can preferably be defined as a rise which is linear or straight in regions. A rise in the wall thickness of the transition section which is linear at least in regions permits simple quality control and checking of the actual dimensioning of the link unit, it being possible for the forces which can be transmitted by the link unit to be calculated in advance to a particularly satisfactory extent. As an alternative, there can preferably also be more complex hyperbolic or parabolic rises in the wall thickness of the transition section, it being possible for higher forces to be transmitted in the case of said increase profiles and, although the quality control for this is made somewhat more difficult, it is still possible, for example, by way of more complicated, laser-based measuring methods.

In particular, the transition section preferably has a transition extent which is in a ratio of from 0.8 to 7, preferably from 2 to 6 and particularly preferably of approximately from 4 to 5.5 to the difference between the wall thickness of the upset section and the wall thickness of the tubular section. Here, the transition extent of the transition section is preferably defined as an extent of the transition section transversely with respect to the contact area between the upset section and the node element. In other words, the transition extent runs perpendicularly with respect to the measuring direction of the wall thicknesses of the upset section and/or the tubular section. In other words, the ratio of the transition extent to the difference between the wall thickness of the upset section and the wall thickness of the tubular section is an expression for the gradient of the rise in the wall thickness between the tubular section and the upset section. Here, the preferred range of from 0.8 to 7 has been proven to be the range, in which a damaging notch effect can just be prevented at its lower limit and the installation space requirement of the transition section can just be reduced to an advantageous minimum at its upper limit of 7. A range of from 2 to 6 of said ratio is particularly preferred, since, within said ratio range, both weight optimization on account of the overall possible thin wall thicknesses and the simultaneously low notch effect or inclination to a notch effect of the material in the region of the transition section can be achieved. Here, the particularly preferred range of from approximately 4 to 5.5 of the ratio of the transition extent to the difference between the wall thickness of the upset section and the wall thickness of the tubular section has proven advantageous, in particular, in relation to the reshaping method which is used for producing the link unit according to the invention, because a ratio range of this type has been proven as a result of a particularly favorable structure profile and, at the same time, satisfactory reshapability of the material with a low tendency to produce cracks and structure damage.

In particular, the transition section preferably has a curvature which merges tangentially into the tubular section or into the upset section. Here, tangentially merging is considered to mean, in particular, a rounded surface, that is to say the inner face or the outer face of the upset section, which merges tangentially into the correspondingly adjoining inner face or outer face of the tubular section or the upset section. A curvature with a tangential transition into the respectively adjoining surface of the tubular section of the upset section achieves an optimum minimization of the notch effect in the region of the transition between the transition section and the tubular section and/or the transition section and the upset section.

The transition section particularly preferably has two curvatures, of which one merges tangentially into the tubular section and the other merges tangentially into the upset section. Although two tangential curvatures are associated with higher production complexity, it can prove advantageous to accept said production complexity, in order to achieve an even more improved avoidance of the notch effect and in this way for it to be possible to achieve the service life of the link unit in the case of the cyclical loads to be expected. In particular, it can be preferred here that the two curvatures which are arranged on the transition section also merge tangentially into one another, with the result that the first curvature runs tangentially with respect to the tubular section and, at its opposite end, runs tangentially with respect to the second curvature, and the second curvature, starting from the tangential transition from the first curvature, merges tangentially into the upset section. It goes without saying that a configuration of this type of the transition section makes substantially higher requirements on the manufacturing accuracy during the reshaping of the carrier in order to form the upset section than would be the case in the configuration of a simple, single curvature in the region of the transition section on either the tubular section or the upset section. Said increased manufacturing complexity can be justified, however, in view, in particular, of the particularly high demands made of the link unit with regard to the transmission of force and, at the same time, low wall thicknesses for weight minimization.

The outer contour of the upset section is advantageously substantially identical to the outer contour of the tubular section. Here, furthermore, the outer contour of the upset section is preferably oriented substantially concentrically with respect to the outer contour of the tubular section. In particular, in the preferred case where both the outer contour of the tubular section and the outer contour of the upset section are of cylindrical configuration, they have the same external diameter in said preferred embodiment. The advantage of said preferred embodiment is that the outer face of the link unit which is constructed from the carrier and the node element can be finished or polished and ground particularly simply in this way and therefore provides few attack points for corrosive media.

As an alternative, the inner contour of the upset section is preferably substantially identical to the inner contour of the tubular section. In other words, the alternative to the identical configuration of the outer contour of the tubular section and the upset section means that the wall thickness increase in the region of the upset section runs toward the outside. By way of said preferred embodiment, the geometrical moment of inertia with respect to bending can be increased locally, since the mean diameter of the upset section which is decisive for the calculation of the geometrical moment of inertia is higher than the mean diameter of the tubular section. In particular, a relatively thin tube can be adapted in this way to a contact area of the node element with a greater extent along the plane, in which the carrier is joined to the node element.

In a further preferred embodiment, the node element has a wall thickness in the region of its attachment to the connecting section, which wall thickness is in a ratio of from 0.75 to 1.5 to the wall thickness of the upset section. For the case, in particular, where, in order to increase the variability of the use of a carrier according to the invention, said carrier is fixed to node elements which are designed with different sizes or thicknesses, it is advantageous that the wall thickness difference between the node element and the corresponding upset section of the carrier does not exceed or undershoot a ratio of from 0.75 to 1.5. It has been shown within the context of the present invention that the notch effect to be expected can be kept within limits only within said ratio range, and therefore the service life of the connecting region between the node element and the carrier or upset section is increased. Nevertheless, it can prove advantageous to accept a certain difference between the wall thickness of the node element in the region of its attachment to the connecting section and the wall thickness of the upset section of the carrier and to make provision from the outset within the context of the present invention to permit high variability and capability of combination of different node elements with different carriers and thus to drastically reduce the overall manufacturing and production costs of link units of different size for different commercial vehicles.

The upset section preferably has an upset extent which is in a ratio of from 0.3 to 2.3, preferably from 0.5 to 1.8 and particularly preferably approximately from 0.7 to 1.6 to a transition extent of the transition section. Adhering to the preferred range of from 0.3 to 2.3 ensures that the upset section is configured in such a way that sufficient material is provided for melting the carrier in the region of the upset section which is partially removed during the use of the rotary friction welding method, an increase in weight being avoided at the same time, by the length of the transition region being adapted proportionally to the upset extent. By the transition extent being kept to be not shorter than 0.3 times the upset extent, a sufficient safety factor is additionally advantageously present in the case of a complete removal of the upset section, it being possible for the transition section to serve on its side with the greater wall thickness for fixing the node element. It has been determined that high safety against complete consumption of the upset section with, at the same time, only a small weight increase can be achieved by way of the preferred ratio range of from 0.5 to 1.8. By a preferred range of from 0.7 to 1.6 being selected, the link unit can be adapted in a particularly satisfactory manner to the requirements which prevail in heavy duty commercial vehicles, since a particularly satisfactory ratio of the strength of the connection between the carrier and the node element and, at the same time, an only low weight of the link unit, in particular as a result of the only small length of the transition section.

BRIEF DESCRIPTION OF THE DRAWINGS

Further advantages and features of the present invention result from the following description with reference to the following figures. It goes without saying that individual features which are shown only in individual embodiments can also be used in other embodiments which are shown, as long as this has not been ruled out explicitly or is prohibited on account of technical conditions. In the figures.

DETAILED DESCRIPTION OF THE PREFERRED EMBODIMENTS

Figure 1A:
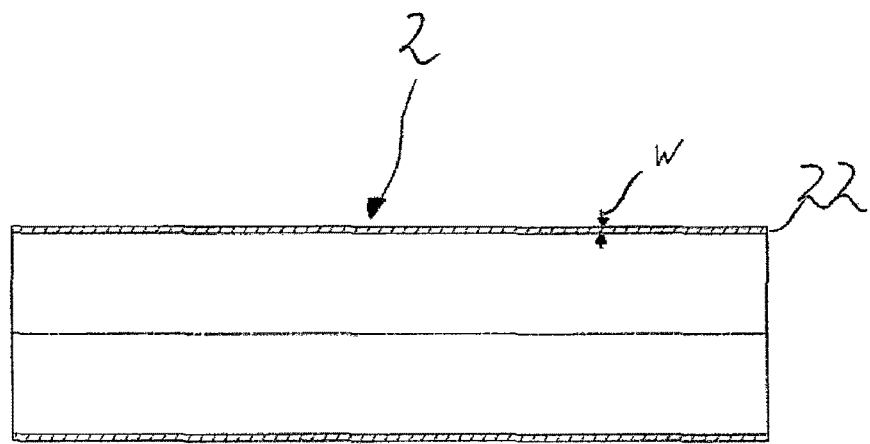
FIGS. 1a, 1b and 1c show the essential production steps for producing a link unit according to the invention.
Figure 1B:
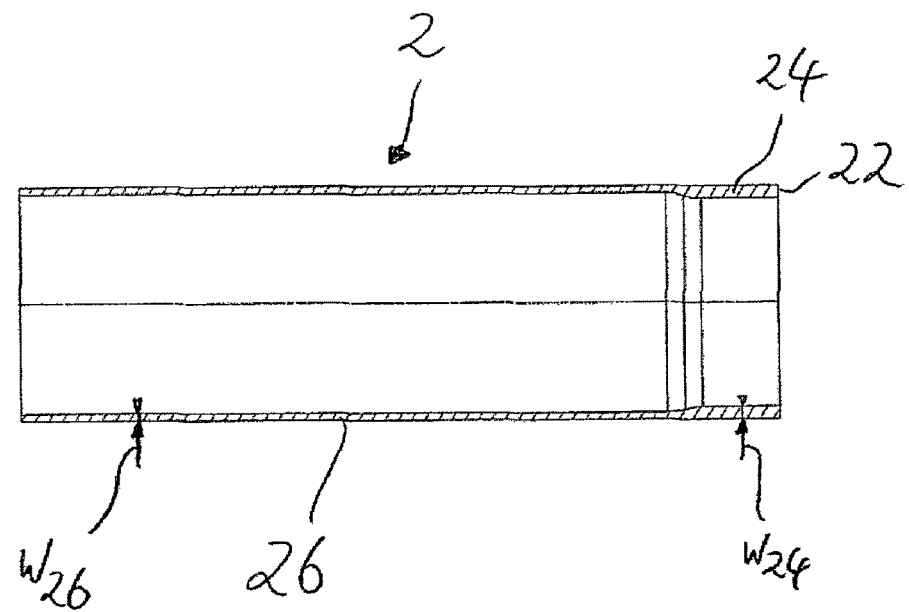
Figure 1C:
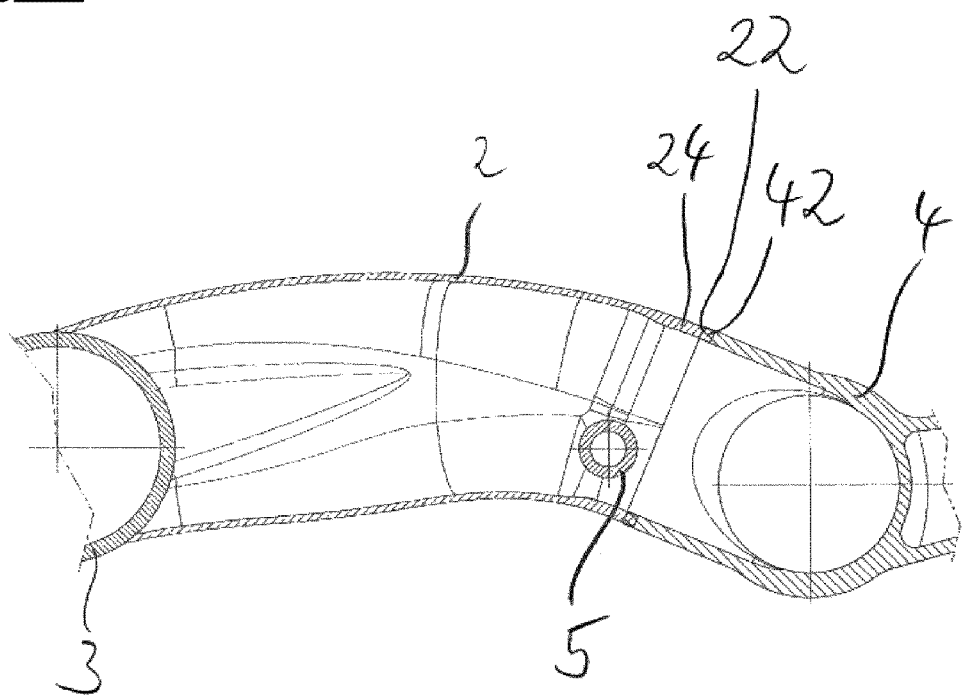

FIG. 1a shows the first step of the method for producing a link unit, a carrier 2 which is preferably configured as a simple tube and has a substantially constant wall thickness w. In particular, it is preferred that, before the beginning of the method, the carrier 2 is a straight cylindrical tube which extends in a rotationally symmetrical manner with respect to a cylinder axis which is shown in the figure. FIG. 1b shows one preferred embodiment of the carrier 2 after the reshaping method has been carried out, an upset section 24 being formed on the right-hand side of the carrier 2 in the figure, which upset section 24 has a higher wall thickness $w_{24}$ than the wall thickness of the remaining regions of the carrier 2. Here, the non-deformed or non-upset region of the carrier 2 is preferably defined as a tubular section 26 which has a wall thickness $w_{26}$ which is preferably equal to the wall thickness w of the non-processed carrier 2 which is shown in FIG. 1a. FIG. 1c shows the preferred embodiment of the link unit according to the invention, after a node element 4 has been connected to the carrier 2 in an integrally joined and non-releasable manner by way of a rotary friction welding method. Here, in particular, melting has been achieved in the region of the connecting section 22 of the carrier 2 and a joint section 42 of the node element, via which melting the accordingly corresponding material or the corresponding wall of the node element 4 is fixed firmly on the carrier 2 via inter-metallic or atomic connection of the respective production materials. Furthermore, FIG. 1c shows the carrier 2 in its preferred second state, the carrier 2 being of curved configuration, that is to say, in particular, preferably no longer being a rectilinear cylinder. The curved configuration of the carrier serves, in particular, to optimize the installation space and the transmission of bending moments between the bearing socket 3 which is fixed on the carrier 2 on the left-hand side and a bending moment which occurs in the region of the node element 4 and preferably runs about an axis which runs perpendicularly with respect to the plane of observation. Furthermore, FIG. 1c shows a holding element 5 which is fixed on the carrier 2 or, in particular, in the region of the upset section 24 and is likewise preferably fixed on the carrier 2 by way of friction welding.

Figure 2:
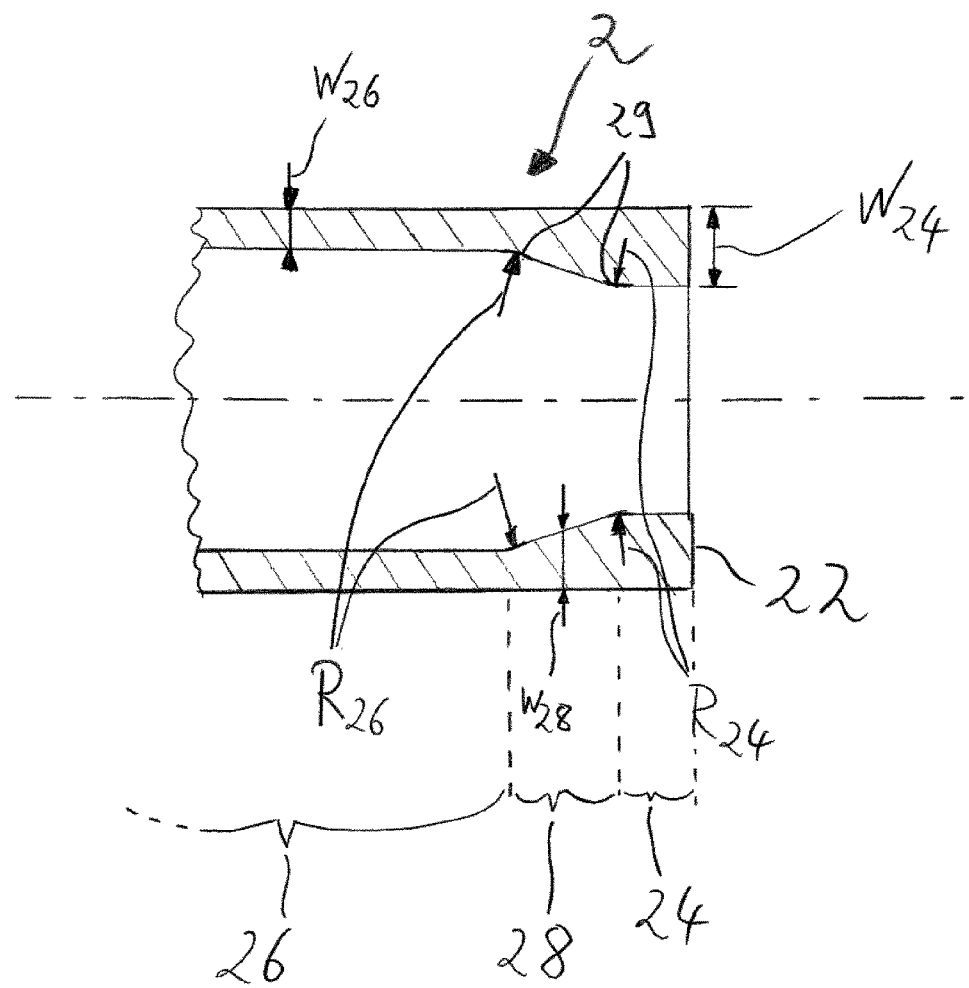
FIG. 2 shows a sectional view of one preferred embodiment of the carrier according to the invention.

FIG. 2 shows a sectional view of one preferred embodiment of the carrier 2. Here, in particular, the individual wall thicknesses w of the tubular section 26 of the transition section 28 and the upset section 24 are labeled. Here, the tubular section 26 has a wall thickness $w_{26}$ which is smaller than the wall thickness $w_{24}$ of the upset section 24. Here, the transition section 28 is preferably provided between the tubular section 26 and the upset section 24, the wall thickness $w_{28}$ of which transition section 28 advantageously increases monotonically toward the upset section 24. In particular, curvatures 29 are preferably provided in the transition region between the tubular section 26 and the transition section 28 and between the transition section 28 and the upset section 24. Here, the curvatures 29 in the region between the tubular section 26 and the transition section 28 have a curvature radius of $R_{26}$, and the curvatures 29 in the region between the transition section 28 and the upset section 24 have a curvature radius of $R_{24}$. It is preferred here, in particular, that the curvature radii $R_{26}$ and $R_{24}$ are substantially identical. Here, substantially identical preferably means that small deviations on account of manufacturing tolerances should be capable of being tolerated within the context of the present invention.

Figure 3:
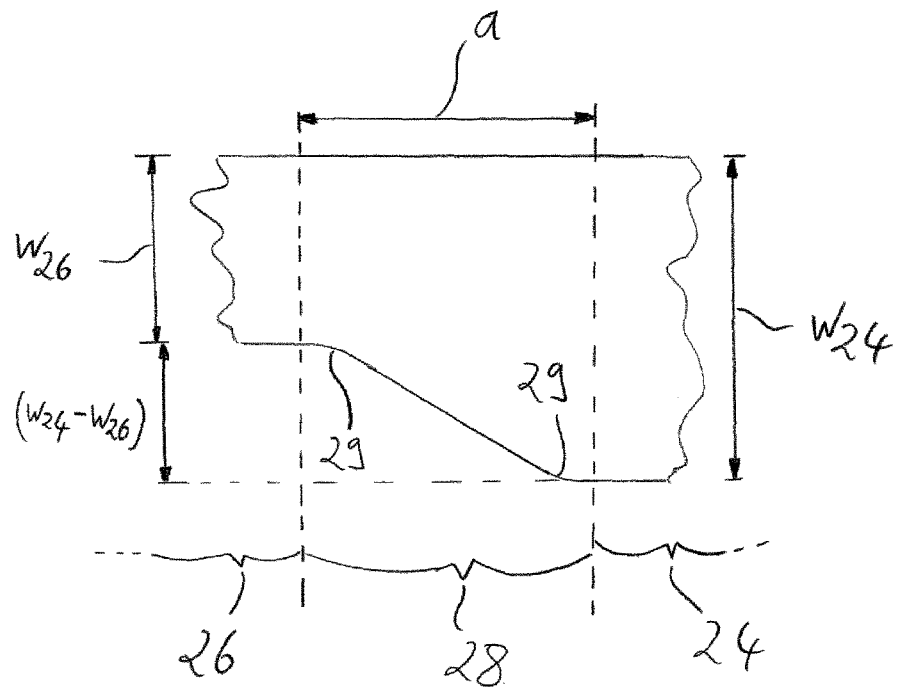
FIG. 3 shows a detailed view of the transition section of the preferred embodiment which is shown in FIG. 2.

FIG. 3 shows a detailed sectional view of the transition section 28 of the preferred embodiment of the link unit according to the invention which has already been shown in FIG. 2. Here, in particular, the transition extent a is labeled. The transition extent a therefore preferably also comprises the curvatures 29, the curvatures 29 preferably merging in each case into the adjacent region, in the present case the adjacent inner face of the tubular section 26 on the left-hand side and the adjacent inner face of the upset section 24 on the right-hand side. Furthermore, $(w_{24}-w_{26})$ shows the difference between the wall thickness $w_{24}$ of the upset section 24 and the wall thickness $w_{26}$ of the tubular section 26. It is preferred that the transition extent a is in a ratio of from 0.8 to 7 to the wall thickness difference $(w_{24}-w_{26})$. In the preferred embodiment which is shown in the present case, said ratio lies in the range of from 4 to 5.5.

Figure 4:
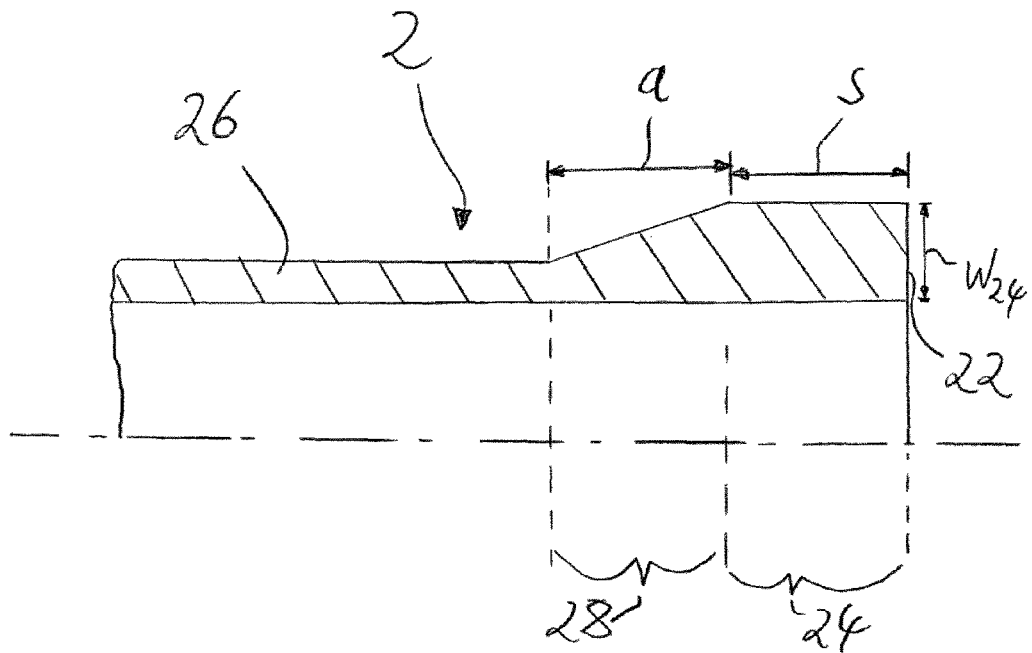
FIG. 4 shows a view of a further preferred embodiment of the link unit according to the invention.

FIG. 4 shows a sectional view of a further preferred embodiment of the carrier 2 according to the invention, it being clear that the upset section 24 has a preferred upset extent s which lies in a preferred ratio of from 0.7 to 1.6 to the transition extent a of the transition section 28 which is provided in an adjoining manner. It is advantageously ensured in this way that the upset section 24 is configured in such a way that sufficient material is provided for melting the carrier 2 in the region of the upset section 24, which material is partially removed during the use of the rotary friction welding method. At the same time, the upset section 24 should not be longer than 1.6 times the extent of the transition section, in order not to unnecessarily increase the weight of the carrier 2 by way of regions with a great wall thickness $w_{24}$ of the upset section 24 which are too large or are oversized. Furthermore, the preferred embodiment of the carrier which is shown in FIG. 4 has, as an alternative to the embodiments which are shown in FIGS. 1 to 3, a constant inner geometry of the carrier 2 from the tubular section 26 via the transition section 28 as far as the upset section 24.

LIST OF DESIGNATIONS

2 Carrier
3 Bearing socket
4 Node element
5 Holding element
22 Connecting section
24 Upset section
26 Tubular section
28 Transition section
29 Curvature
42 Joint section
a Transition extent
s Upset extent
$R_{24}$ Curvature radius
$R_{26}$ Curvature radius
w Wall thickness, general
$w_{24}$ Wall thickness of the upset section
$w_{26}$ Wall thickness of the tubular section
$w_{28}$ Wall thickness of the transition section

The invention claimed is:

1. A method for producing a link unit, comprising:
   providing a carrier which has a first connecting section;
   cold forming the carrier in a region of the first connecting section to form an upset section, the wall thickness of the carrier being increased in the region of the upset section;
   providing a node element with a joint section; and
   connecting the joint section to the first connecting section by rotary friction welding, and
   wherein the carrier includes a second connecting section at an end of the carrier which lies opposite the first connecting section, on which second connecting section a bearing socket is fixed.

2. The method as claimed in claim 1, the carrier comprises a substantially hollow-cylindrical shape in a first state, and being changed by the cold forming into a second state, in which the carrier comprises a curved configuration.

3. The method as claimed in claim 2, wherein the carrier is at least one of changed into the second state after welding to the node element, and the carrier is changed into the second state before welding to the node element.

4. The method as claimed in claim 1, the outer contour of the carrier being kept substantially constant during the forming of the upset section.

5. A link unit for a vehicle, comprising:
a carrier; and
a node element;
wherein the carrier includes a hollow body and a tubular section and an upset section adjacent to the tubular section;
wherein the upset section has a greater wall thickness than the tubular section;
wherein the node element is configured to be fixed on the carrier by rotary friction welding on a side of the upset section which faces away from the tubular section; and
wherein the carrier has a structure strength which is increased by cold forming a region between the tubular section and the upset section.

6. The link unit as claimed in claim 5, the upset section having a mean wall thickness which is in a ratio of from 1.1 to 5 to the mean wall thickness of the tubular section.

7. The link unit as claimed in claim 6, wherein the ratio of the mean wall thickness of the upset section to the mean wall thickness of the tubular section is 1.2 to 4.

8. The link unit as claimed in claim 7, wherein the ratio of the mean wall thickness of the upset section to the mean wall thickness of the tubular section is 1.2 to 3.5.

9. The link unit as claimed in claim 5, further comprising:
a transition section arranged between the tubular section and the upset section, the transition section having a wall thickness which increases monotonically toward the upset section.

10. The link unit as claimed in claim 9, the transition section having a transition extent which is in a ratio of from 0.8 to 7 to a difference between the wall thickness of the upset section and the wall thickness of the tubular section.

11. The link unit as claimed in claim 10, wherein the ratio of the transition extent to the difference between the wall thickness of the upset section and the wall thickness of the tubular section is 2 to 6.

12. The link unit as claimed in claim 11, wherein the ratio of the transition extent to the difference between the wall thickness of the upset section and the wall thickness of the tubular section is 4 to 5.5.

13. The link unit as claimed in claim 5, the transition section having a curvature which merges tangentially into at least one of the tubular section and the upset section.

14. The link unit as claimed in claim 5, the outer contour of the upset section being substantially identical to the outer contour of the tubular section.

15. The link unit as claimed in claim 5, the inner contour of the upset section being substantially identical to the inner contour of the tubular section.

16. The link unit as claimed in claim 5, the node element having a wall thickness in the region of the attachment of the node element to the connecting section, which wall thickness is in a ratio of from 0.75 to 1.5 to the wall thickness of the upset section.

17. The link unit as claimed in claim 5, the upset section having an upset extent which is in a ratio of from 0.3 to 2.3 to a transition extent of the transition section.

18. The link unit as claimed in claim 17, wherein the ratio of the upset extent to the transition extent is 0.5 to 1.8.

19. The link unit as claimed in claim 18, wherein the ratio of the upset extent to the transition extent is 0.7 to 1.6.

* * * * *